US009769456B2

(12) United States Patent
You et al.

(10) Patent No.: US 9,769,456 B2
(45) Date of Patent: Sep. 19, 2017

(54) CAMERA FOR MEASURING DEPTH IMAGE AND METHOD OF MEASURING DEPTH IMAGE

(71) Applicant: Samsung Electronics Co., Ltd., Suwon-si, Gyeonggi-do (KR)

(72) Inventors: Jangwoo You, Seoul (KR); Byunghoon Na, Suwon-si (KR); Yonghwa Park, Yongin-si (KR); Changyoung Park, Yongin-si (KR); Heesun Yoon, Seoul (KR); Sanghun Lee, Seoul (KR); Myungjae Jeon, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/699,068

(22) Filed: Apr. 29, 2015

(65) Prior Publication Data

US 2016/0138910 A1 May 19, 2016

(30) Foreign Application Priority Data

Nov. 13, 2014 (KR) ........................ 10-2014-0158061

(51) Int. Cl.
| | |
|---|---|
| *H04N 13/02* | (2006.01) |
| *G01S 17/06* | (2006.01) |
| *G01S 17/02* | (2006.01) |
| *G01S 17/89* | (2006.01) |
| *G01S 7/481* | (2006.01) |

(52) U.S. Cl.
CPC ....... *H04N 13/0203* (2013.01); *G01S 7/4816* (2013.01); *G01S 17/023* (2013.01); *G01S 17/06* (2013.01); *G01S 17/89* (2013.01); *H04N 13/0253* (2013.01); *H04N 13/0285* (2013.01); *H04N 13/0289* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,616,912 A | * | 4/1997 | Robinson | ............... G02B 21/22 250/201.1 |
| 2002/0131170 A1 | * | 9/2002 | Costales | ................ G02B 21/22 359/464 |

(Continued)

FOREIGN PATENT DOCUMENTS

| | | |
|---|---|---|
| JP | 2012100101 A | 5/2012 |
| JP | 2014036362 A | 2/2014 |

(Continued)

*Primary Examiner* — Twyler Haskins
*Assistant Examiner* — Akshay Trehan
(74) *Attorney, Agent, or Firm* — Harness, Dickey & Pierce, P.L.C.

(57) ABSTRACT

A depth image measuring camera includes an illumination device configured to irradiate an object with light, and a light-modulating optical system configured to receive the light reflected from the object. The depth image measuring camera includes an image sensor configured to generate an image of the object by receiving light incident on the image sensor that passes through the light-modulating optical system. The light-modulating optical system includes a plurality of lenses having a same optical axis, and an optical modulator configured to operate in two modes for measuring a depth of the object.

12 Claims, 6 Drawing Sheets

(56) References Cited

U.S. PATENT DOCUMENTS

| | | | |
|---|---|---|---|
| 2009/0041338 A1* | 2/2009 | Sawachi | H04N 13/0022 382/154 |
| 2009/0128833 A1* | 5/2009 | Yahav | G01S 17/023 356/623 |
| 2010/0128109 A1* | 5/2010 | Banks | G01S 7/4816 348/46 |
| 2011/0134078 A1* | 6/2011 | Hsu | G01C 3/08 345/175 |
| 2012/0147147 A1* | 6/2012 | Park | H04N 5/2256 348/49 |
| 2012/0154537 A1* | 6/2012 | Chang | H04N 5/2256 348/46 |
| 2012/0162370 A1* | 6/2012 | Kim | G01B 11/02 348/46 |
| 2012/0188347 A1* | 7/2012 | Mitchell | A61B 1/00193 348/50 |
| 2012/0314037 A1* | 12/2012 | Nehmadi | G01C 11/06 348/48 |
| 2013/0038690 A1* | 2/2013 | Mitchell | A61B 1/00193 348/46 |
| 2013/0215235 A1* | 8/2013 | Russell | H04N 13/0203 348/47 |
| 2013/0250062 A1* | 9/2013 | Tin | H04N 13/0018 348/46 |
| 2013/0321790 A1* | 12/2013 | Kirby | H04N 13/0239 356/3.14 |
| 2014/0028804 A1* | 1/2014 | Usuda | G01S 17/023 348/47 |

FOREIGN PATENT DOCUMENTS

| | | |
|---|---|---|
| KR | 10-1012691 B1 | 2/2011 |
| KR | 20130077330 A | 7/2013 |

* cited by examiner (a)

(b)

(c)

(d)

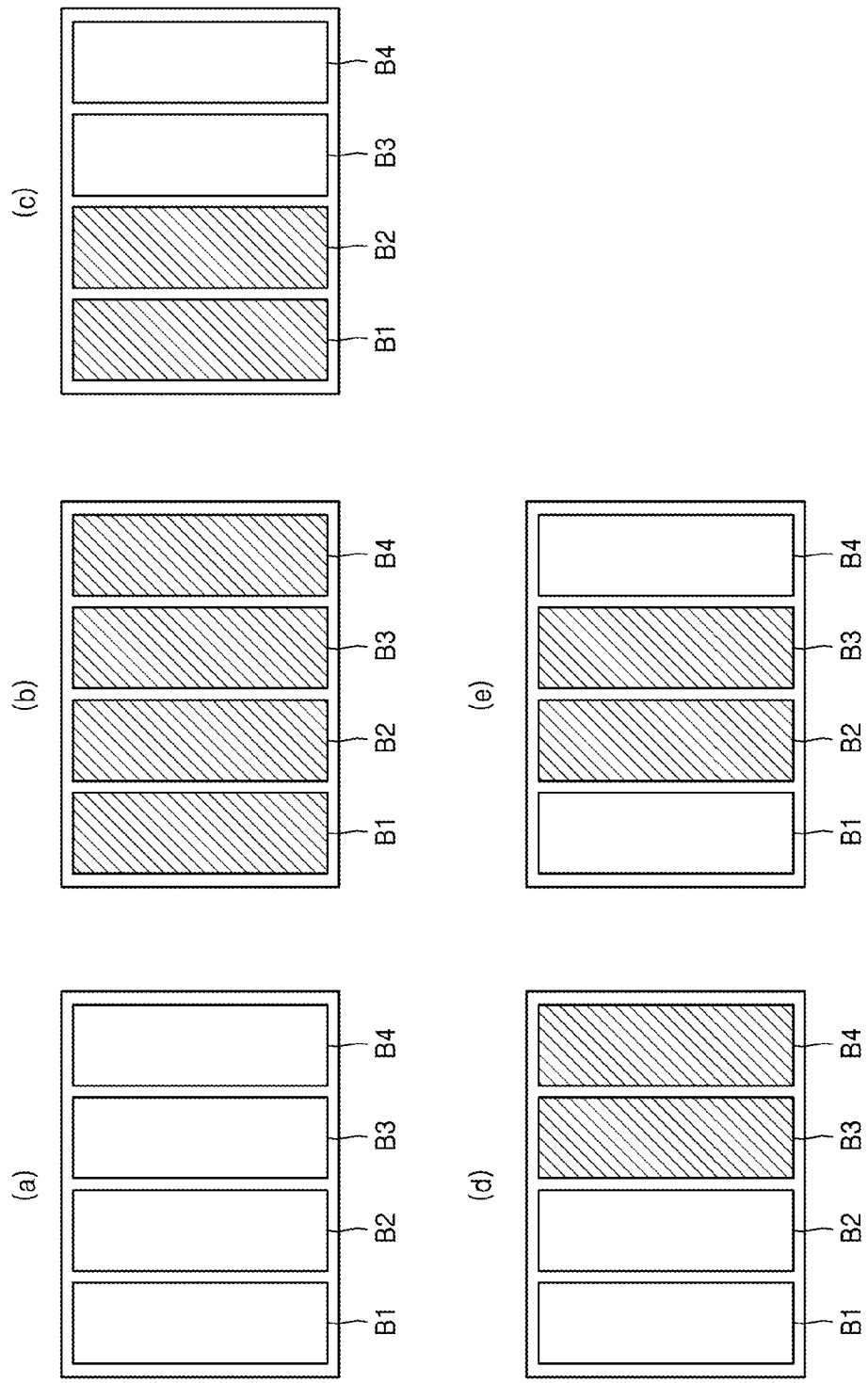

CAMERA FOR MEASURING DEPTH IMAGE AND METHOD OF MEASURING DEPTH IMAGE

RELATED APPLICATION

This application claims the benefit of Korean Patent Application No. 10-2014-0158061, filed on Nov. 13, 2014, in the Korean Intellectual Property Office, the disclosure of which is incorporated herein in its entirety by reference.

BACKGROUND

1. Field

At least one example embodiment relates to cameras for measuring a depth-image and/or methods of operating the cameras for measuring a depth-image.

2. Description of the Related Art

A depth-image with respect to an object may be measured by mainly two methods.

The first method is measuring a depth image by using patterned light and an optical trigonometry.

The second method is extracting a depth image from a time-of-flight (TOF) of infrared (IR) rays that return from an object after irradiating the object with the IR rays.

A TOF camera irradiates an object with invisible near infrared rays after modulating the invisible near infrared rays to a few tens of MHz frequency and measures a phase delay of light returning from the object by using an image sensor. The TOF camera generates a depth image by obtaining distances from the object to the camera at each pixel of the image sensor.

A depth image with respect to an object may be sensed using a stereo method. The TOF method may be favorable for relatively long distance image recognition and motion recognition. The stereo method may be favorable for relatively short distance image recognition and motion recognition.

SUMMARY

At least one example embodiment provides depth image measuring cameras that obtain a depth image having a high-resolution regardless of the distance to an object.

At least one example embodiment provides methods of operating the depth image measuring camera.

Additional aspects will be set forth in part in the description which follows and, in part, will be apparent from the description, or may be learned by practice of example embodiments.

According to at least one example embodiment, a depth image measuring camera includes an illumination device configured to irradiate an object with light, and a light-modulating optical system configured to receive the light reflected from the object. The camera includes an image sensor configured to generate an image of the object by receiving light incident on the image sensor that passes through the light-modulating optical system. The light-modulating optical system includes a plurality of lenses having a same optical axis, and an optical modulator configured to operate in two modes for measuring a depth of the object.

According to at least one example embodiment, the two modes are a time-of-flight (TOF) mode and a stereo mode.

According to at least one example embodiment, the light-modulating optical system includes an aperture, and the optical modulator is adjacent to the aperture.

According to at least one example embodiment, the optical modulator is between the plurality of lenses.

According to at least one example embodiment, the optical modulator is outside the plurality of lenses.

According to at least one example embodiment, the optical modulator includes an active area onto which light is irradiated, and the active area includes a plurality of regions configured to independently operate based on the two modes.

According to at least one example embodiment, the plurality of regions is at least two regions.

According to at least one example embodiment, the plurality of regions have a same shape and a same area.

According to at least one example embodiment, some of the plurality of regions have a different shape than others of the plurality of regions.

According to at least one example embodiment, a method of operating a light-modulating optical system having the optical modulator includes selectively turning-on and turning-off the plurality of regions based on an operation mode of the optical modulator for measuring a depth of an object.

According to at least one example embodiment, the plurality of regions have a same shape and a same area.

According to at least one example embodiment, some of the plurality of regions have a different shape from others of the plurality of regions.

According to at least one example embodiment, the selectively turning-on and turning-off the plurality of regions simultaneously turns-on or simultaneously turns-off the plurality of regions if the optical modulator is in a time-of-flight (TOF) mode for measuring the depth of the object.

According to at least one example embodiment, if the optical modulator is in a stereo mode for measuring the depth of the object, the selectively turning-on and turning-off the plurality of regions includes a first operation of turning-on first regions of the plurality of regions and turning-off second regions of the plurality of regions, a second operation of turning-off the first regions and turning-on the second regions; and sequentially repeating the first operation and the second operation.

According to at least one example embodiment, the method includes generating an image of the object based on light received through the optical modulator as a result of the selectively turning-on and turning-off the plurality of regions.

BRIEF DESCRIPTION OF THE DRAWINGS

These and/or other aspects will become apparent and more readily appreciated from the following description of the example embodiments, taken in conjunction with the accompanying drawings in which:

FIGS. 9 and 10 are front views illustrating an operation of a depth image measuring camera for measuring a depth image according to at least one example embodiment.

DETAILED DESCRIPTION

Figure 1:
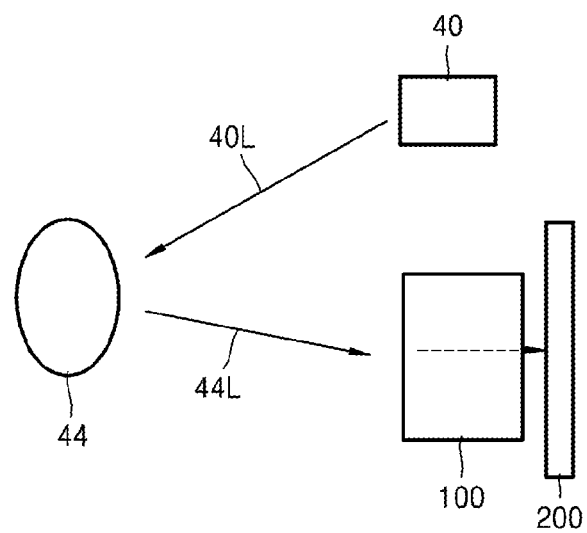
FIG. 1 is a diagram showing a schematic configuration of a depth image measuring system according to at least one example embodiment.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Expressions such as "at least one of," when preceding a list of elements, modify the entire list of elements and do not modify the individual elements of the list.

The depth image measuring camera may be a 3D camera that may be used in both a TOF method and a stereo method.

First, the depth image measuring camera will be described.

FIG. 1 is a diagram showing a schematic configuration of a depth image measuring system including a camera according to at least one example embodiment.

Referring to FIG. 1, the camera may include an illumination device 40, a light-modulating optical system 100, and an image sensor 200. Although not shown, the camera may include a controller (e.g., a special purpose processor) that controls the illumination device 40, the light-modulating optical system 100, and the image sensor 200, and a signal processor that processes a depth image signal that is generated from the image sensor 200. The illumination device 40 may be a light source that emits infrared rays. The illumination device 40 may include, for example, a laser diode (LD) or light-emitting diode (LED) that emits IR rays or near IR rays. Reference numeral 40L indicates light emitted from the illumination device 40 to an object 44. Light reflected 44L from the object 44 is input into the image sensor 200 through the light-modulating optical system 100. The image sensor 200 may be a mono (black and white) charge-coupled device (CCD) having no color filter, a complementary metal oxide semiconductor (CMOS) image sensor, or an organic image sensor. The light-modulating optical system 100 may include an optical modulator that may operate according to a TOF method and a stereo method. The optical modulator may be a device that controls optical transmittance by applying an electrical signal thereto and may be a high speed optical modulator that uses a compound semiconductor.

Figure 2:
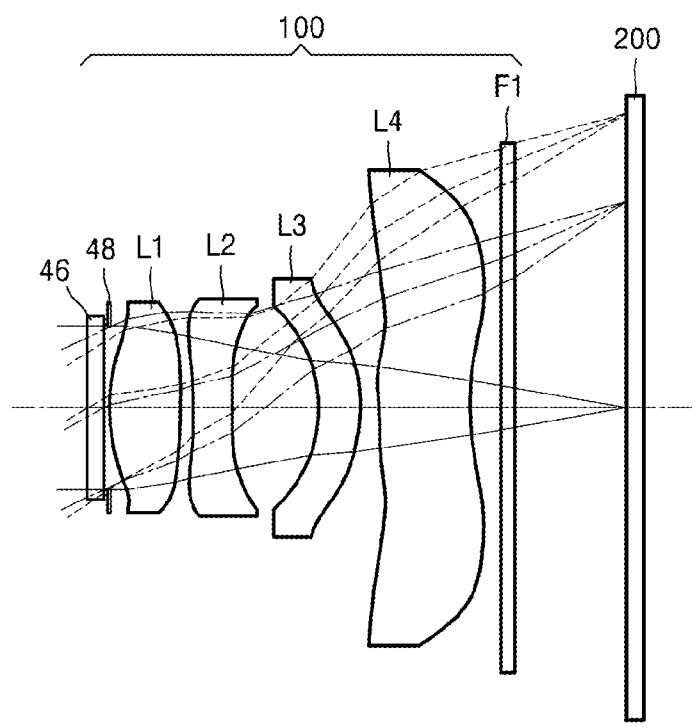
FIG. 2 a cross-sectional view of a light-modulating optical system of FIG. 1, according to at least one example embodiment.

FIG. 2 a cross-sectional view of the light-modulating optical system 100 of FIG. 1 according to at least one example embodiment.

Referring to FIG. 2, the light-modulating optical system 100 may include an optical modulator 46, an aperture 48, first to fourth lenses L1 to L4, and a first filter F1. The optical modulator 46 may operate according to the TOF method and the stereo method. An active area, that is, an area on which light inputs may be partitioned into a plurality of regions, will be described below.

Light that is input into the light-modulating optical system 100 sequentially passes through the optical modulator 46, the first to fourth lenses L1 to L4, and the first filter F1, and afterwards, enters into the image sensor 200. The aperture 48 may be disposed between the optical modulator 46 and the first lens L1. The amount of light that enters into the first lens L1 may be determined by the aperture 48. The optical modulator 46 may be disposed close to the aperture 48. Alternatively, the optical modulator 46 may contact the aperture 48. The first to fourth lenses L1 to L4 may be aspheric lenses. In the light-modulating optical system 100, some of the first to fourth lenses L1 to L4 may have a positive power and some of the first to fourth lenses L1 to L4 may have a negative power. The first to fourth lenses L1 to L4 may have different diameters from each other. The first filter F1 may be a band pass filter. For example, the first filter F1 may allow only infrared rays to pass. All constituent elements included in the light-modulating optical system 100 may have the same optical axis.

Figure 3:
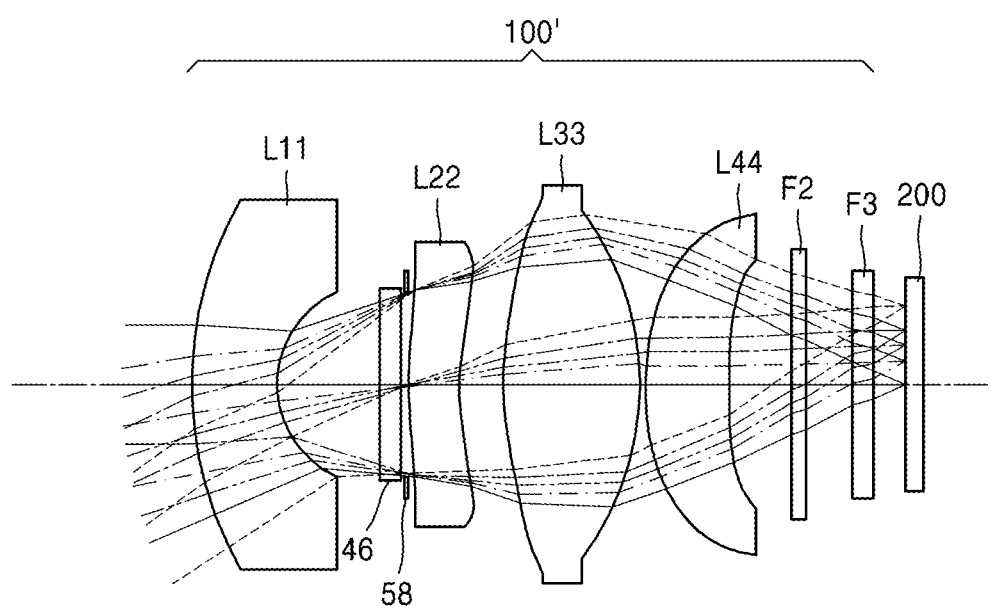
FIG. 3 is a cross-sectional view of a light-modulating optical system of FIG. 1 according to at least one example embodiment.

FIG. 3 is a cross-sectional view of the light-modulating optical system 100 of FIG. 1 according to at least one example embodiment.

Referring to FIG. 3, the light-modulating optical system 100' may include first to fourth lenses L11 to L44, an optical modulator 46, an aperture 58, and second and third filters F2 and F3. The first to fourth lenses L11 to L44 are sequentially disposed. The optical modulator 46 is provided between the first lens L11 and the second lens L22. The aperture 58 is disposed between the optical modulator 46 and the second lens L22. The optical modulator 46 and the second lens L22 may be disposed close to the aperture 58. Alternatively, the aperture 58 and the optical modulator 46 may contact each other. In FIG. 3, the optical modulator 46 and the second lens L22 are separated from each other. However, the optical modulator 46 may contact a convex portion of a light incident surface of the second lens L22. The second and third filters F2 and F3 are sequentially disposed between the fourth lens L44 and the image sensor 200.

Light reflected from the object 44 is incident to the image sensor 200 after sequentially passing through the first lens L11, the optical modulator 46, the second lens L22, the third lens L33, the fourth lens L44, the second filter F2, and the third filter F3.

The first to fourth lenses L11 to L44 may be aspherical lenses. In the light-modulating optical system 100', some of the first to fourth lenses L11 to L44 may have a positive power, and some of the first to fourth lenses L11 to L44 may have a negative power. The first to fourth lenses L11 to L44 may have different diameters from each other. The first, second, and third lenses L11, L22, and L33 may be separated from each other. The third lens L33 and the fourth lens L44 may be adjacently disposed. Alternatively, the third lens L33 and the fourth lens L44 may contact each other. The second and third filters F2 and F3 may be separated from the fourth lens L44. The second and third filters F2 and F3 may be band pass filters that filter a portion of incident light thereto.

Next, the optical modulator 46 will be described. An active area of the optical modulator 46 may include a plurality of regions. The plurality of regions may be partitioned areas that are separated from each other on the optical modulator 46. Each of the plurality of regions may be independently operated.

Figure 4:
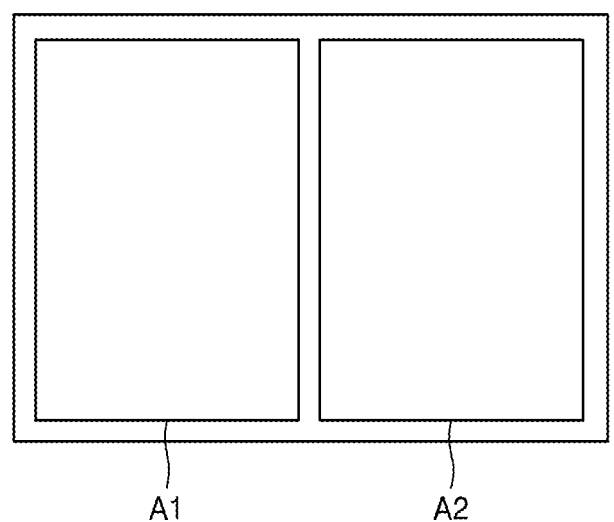
FIGS. 4 through 8 are front views of an optical modulator having a plurality of partitioned regions of FIGS. 2 and 3.
Figure 5:
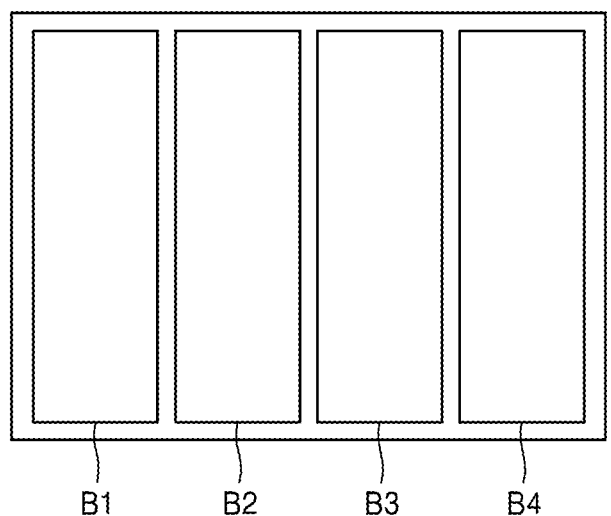

As depicted in FIG. 4, the optical modulator 46 may include first and second regions A1 and A2 as the active area. The first and second regions A1 and A2 have equal areas. Also, as depicted in FIG. 5, the optical modulator 46 may include first to fourth regions B1 to B4, which all have equal areas. The first to fourth regions B1 to B4 have equal areas and are regions partitioned in a horizontal direction.

Figure 6:
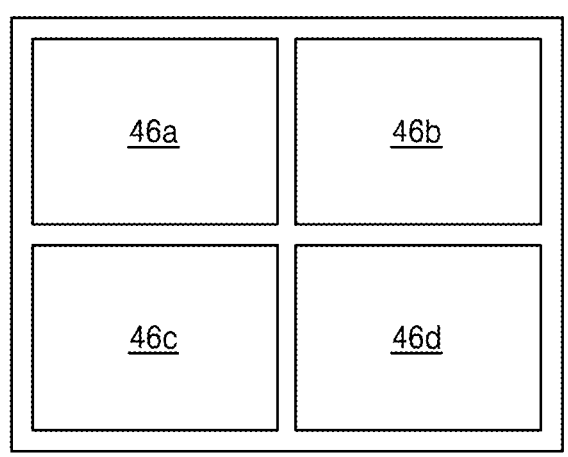

Referring to FIG. 6, the optical modulator 46 includes first to fourth regions 46a to 46d. The first to fourth regions 46a to 46d form a lattice structure.

Figure 7:
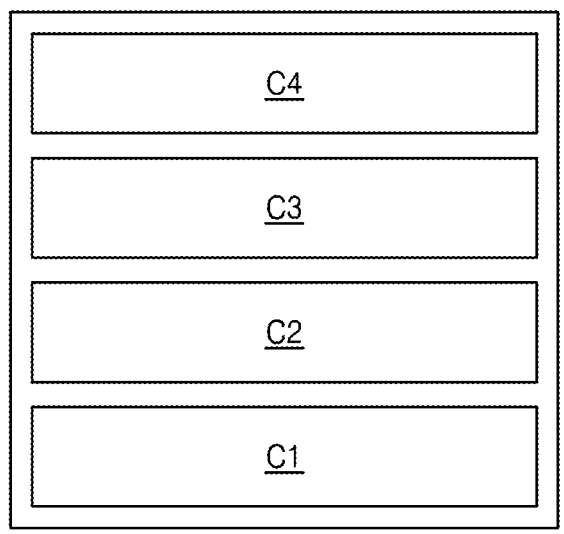

Referring to FIG. 7, the optical modulator 46 includes first to fourth regions C1 to C4, which have equal areas. The first to fourth regions C1 to C4 are formed by partitioning the active area in a vertical direction.

Figure 8:
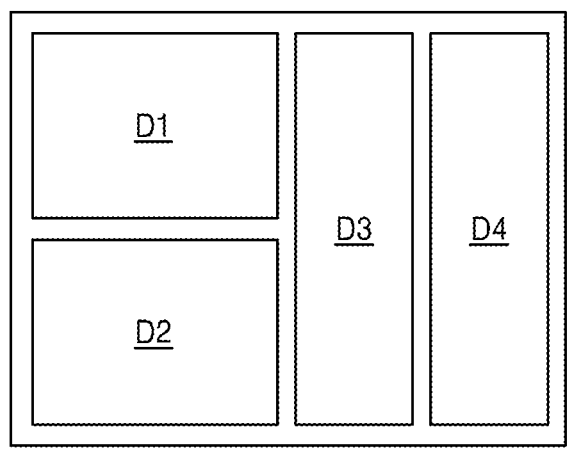

Referring to FIG. 8, the optical modulator 46 includes first to fourth regions D1 to D4. The first to fourth regions D1 to D4 may be a combination of the partitioned regions described above. For example, the first and second regions D1 and D2 may correspond to the first and third regions 46a and 46c of FIG. 6. The third and fourth regions D3 and D4 may correspond to the third and fourth regions B3 and B4 of FIG. 5.

The partitioned regions of the active areas of FIGS. 4 to 8 are examples of partitioning ways, and the partitioning ways of the active area are not limited thereto. For example, the active area of the optical modulator 46 may be partitioned in various combinations based on the partitioning ways depicted in FIGS. 4 to 8. As another example, the active area of the optical modulator 46 may be partitioned into more than four regions.

Next, a method of operating the camera of FIG. 1 will be described.

The optical modulator 46 includes a plurality of partitioned regions. The optical modulator 46 may be operated in various modes by optionally (or selectively) operating the regions, which may determine a mode of operation of the camera. Accordingly, the method of operating the optical modulator 46 is associated with the method of operating the camera.

When an active area of the optical modulator 46 is partitioned into first and second regions A1 and A2, a method of operating the optical modulator 46 will be described with reference to FIG. 9.

FIG. 9*a* indicates a turn-on state of the first and second regions A1 and A2 of the optical modulator 46. That is, FIG. 9*a* indicates that all of the active area of the optical modulator 46 is in a turn-on state. In this case, light incident to the optical modulator 46 may be simultaneously modulated while passing through the first and second regions A1 and A2.

FIG. 9*b* indicates a turn-off state of the first and second regions A1 and A2 of the optical modulator 46. At this point, since all of the active area of the optical modulator 46 is in a turn-off state, light incident to the optical modulator 46 is blocked. The turn-on and turn-off states of the first and second regions A1 and A2 may be performed by applying a driving voltage to the first and second regions A1 and A2, respectively, of the optical modulator 46. For example, when the driving voltage is applied to both of the first and second regions A1 and A2, the first and second regions A1 and A2 may be turned-off, and when the driving voltage is not applied to the first and second regions A1 and A2, the first and second regions A1 and A2 may be turned-on, or vice versa.

As shown in FIGS. 9*a* and 9*b*, the operation mode in which light modulation is performed by turning-on or turning-off of all of the active area of optical modulator 46 is a TOF operation mode where the image sensor 200 measure a distance to the object 44 using a TOF method. The modulation operation in the TOF operation mode may be performed at a high speed (e.g., more than 20 MHz).

Also, all of the active area of the optical modulator 46 may be turned-on or turned-off without modulation. In this case, the optical modulator 46 may be operated simply as a super-high speed optical shutter.

The operation modes of the optical modulator 46 as shown in FIGS. 9*c* and 9*d* are stereo operation modes of the optical modulator 46. Here, both the first and second regions A1 and A2 are not turned-on or turned-off, but one of the first and second regions A1 and A2 is turned-on or turned-off. That is, light is transmitted through only one of the first and second regions A1 and A2.

In the case of FIG. 9*c*, the first region A1 is in a turn-off state, and the second region A2 is in a turn-on state, and the case of FIG. 9*d* is an opposite state to the case of FIG. 9*c*. When the optical modulator 46 is operated as the cases of FIGS. 9*c* and 9*d*, images having different viewpoints may be obtained by the image sensor 200.

When the operations of the optical modulator 46 as the cases of FIGS. 9*c* and 9*d* are repeated, a stereo motion image may be obtained. Here, the repetitive operation of the cases of FIGS. 9*c* and 9*d* (operation speed) may be adjusted to the frame of a motion picture display. Accordingly, the operation speed of the stereo mode may be slower than that of the TOF mode.

Next, when an active area of the optical modulator 46 is partitioned into four regions (for example, the case of FIG. 5), the operation mode of the optical modulator 46 will be described with reference to FIG. 10.

FIGS. 10*a* and 10*b* indicate a TOF operation mode of the optical modulator 46. FIG. 10*a* indicates a case when the first to fourth regions B1 to B4 are simultaneously turned-on, and FIG. 10*b* indicates when the first to fourth regions B1 to B4 are simultaneously turned-off. Accordingly, an optical modulation operation or an optical blocking operation may be simultaneously performed in the first to fourth regions B1 to B4 of the optical modulator 46. When the optical modulator 46 is simply operated as an optical shutter as the cases depicted in FIGS. 10*a* and 10*b*, the optical modulator 46 may be operated as a high speed optical shutter by simultaneously turning-on or turning-off the first to fourth regions B1 to B4. The high speed optical shutter operation may be faster than an optical modulation operation.

FIGS. 10*c* and 10*d* show a stereo operation mode of the optical modulator 46.

More specifically, as depicted in FIG. 10*c*, the optical modulator 46 may be operated so that the first and second regions B1 and B2 are in a turn-off state, and the third and fourth regions B3 and B4 are in a turn-on state. Also, as depicted in FIG. 10*d*, the optical modulator 46 may be operated so that the first and second regions B1 and B2 are in a turn-on state, and the third and fourth regions B3 and B4 are in a turn-off state. Also, as depicted in FIG. 10*e*, the optical modulator 46 may be operated so that the first and fourth regions B1 and B4 are in a turn-on state, and the second and third regions B2 and B3 are in a turn-off state.

When the optical modulator 46 is in a stereo operation mode, although not shown, the first to fourth regions B1 to B4 of the optical modulator 46 may be operated in various combinations. For example, the optical modulator 46 may be operated so that the second and fourth regions B2 and B4 are in a turn-on state, and the first and third regions B1 and B3 are in a turn-off state. Also, the optical modulator 46 may be operated in a stereo mode in which only one of the first to fourth regions B1 to B4 is in a turn-on state or in a turn-off state.

Figure 9:
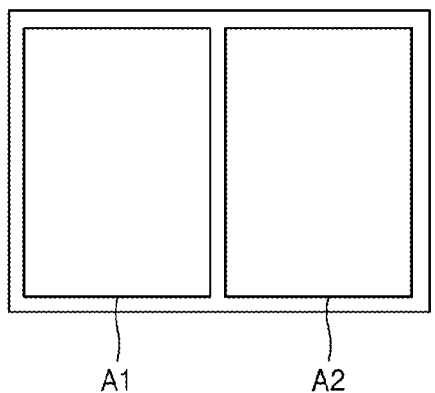
Figure 9:
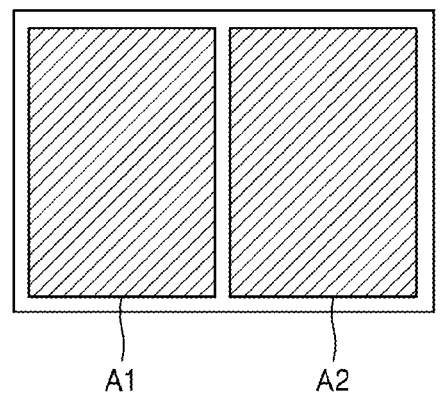
Figure 9:
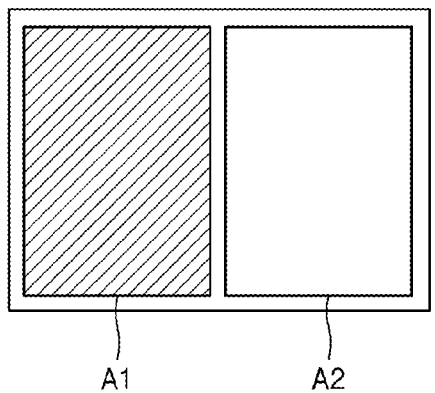
Figure 9:
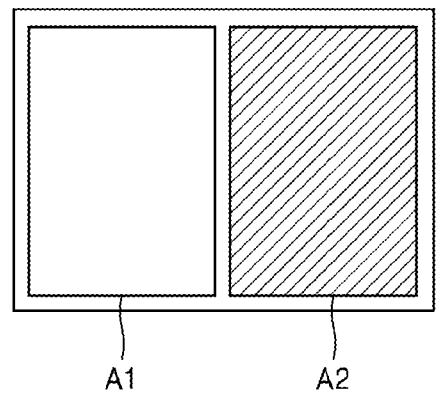

If the active area of the optical modulator 46 is partitioned into more than four regions, the optical modulator 46 may be operated in a TOF mode, an optical shutter mode, or a stereo mode based on the operation modes of FIGS. 9 and 10.

In the depth image measuring camera described above, a multi-functional optical modulator is included close to an aperture of the camera. The multi-functional optical modulator includes a plurality of partitioned regions. The partitioned regions may be operated in a TOF mode or a stereo mode by optionally (or selectively) driving (all or partial driving) the partitioned regions. Accordingly, images of both a short-distance and a long-distance to an object may be obtained with a high resolution. That is, the depth image measuring camera may obtain a high resolution image regardless of the distance to the object.

While one or more example embodiments have been described with reference to the figures, it will be understood by those of ordinary skill in the art that various changes in form and details may be made therein without departing from the spirit and scope as defined by the following claims.

What is claimed is:

1. A depth image measuring camera comprising:
    an illumination device configured to irradiate an object with light;
    a plurality of lenses configured to receive the light reflected from the object, the plurality of lenses having a same optical axis;
    a voltage driven plate configured to operate in two modes for measuring a depth of the object, the voltage driven plate being aligned with the plurality of lenses and including an active area on to which the light reflected from the object is irradiated, wherein the two modes are a time-of-flight (TOF) mode and a stereo mode and the active area includes a plurality of regions configured to independently operate based on the two modes; and
    an image sensor configured to, in the TOF mode and the stereo mode, generate an image of the object by receiving light incident on the image sensor that passes through the voltage driven plate and the plurality of lenses.

2. The depth image measuring camera of claim 1, further comprising:
    an aperture adjacent to the voltage driven plate.

3. The depth image measuring camera of claim 2, wherein the voltage driven plate is between the plurality of lenses.

4. The depth image measuring camera of claim 2, wherein the voltage driven plate is outside the plurality of lenses.

5. The depth image measuring camera of claim 1, wherein the plurality of regions is at least two regions.

6. The depth image measuring camera of claim 1, wherein the plurality of regions have a same shape and a same area.

7. The depth image measuring camera of claim 1, wherein some of the plurality of regions have a different shape than others of the plurality of regions.

8. A method of operating a depth image measuring camera having an illumination device configured to irradiate an object with light, a plurality of lenses configured to receive the light reflected from the object, the plurality of lenses having a same optical axis, a voltage driven plate, the voltage driven plate including an active area with a plurality of regions onto which light is irradiated, the voltage driven plate being configured to independently operate the plurality of regions, and an image sensor configured to generate an image of the object by receiving light incident on the image sensor that passes through the voltage driven plate and the plurality of lenses, the method comprising:
    selectively turning-on and turning-off the plurality of regions based on an operation mode of the depth image measuring camera, the operation mode including a time-of-flight (TOF) mode and a stereo mode;
    receiving, by the plurality of lenses that are aligned with the voltage driven plate, light reflected from an object; and
    generating, in the TOF mode and the stereo mode, an image of the object by receiving light incident on the image sensor that passes through the voltage driven plate and the plurality of lenses as a result of the selectively turning-on and turning-off the plurality of regions.

9. The method of claim 8, wherein the plurality of regions have a same shape and a same area.

10. The method of claim 8, wherein some of the plurality of regions have a different shape from others of the plurality of regions.

11. The method of claim 8, wherein selectively turning-on and turning-off the plurality of regions simultaneously turns-on or simultaneously turns-off the plurality of regions if the operation mode is the time-of-flight (TOF) mode.

12. The method of claim 8, wherein, if the operation mode is the stereo mode, the selectively turning-on and turning-off the plurality of regions includes:
    a first operation of turning-on first regions of the plurality of regions and turning-off second regions of the plurality of regions;
    a second operation of turning-off the first regions and turning-on the second regions; and
    sequentially repeating the first operation and the second operation.

* * * * *